No. 746,603. PATENTED DEC. 8, 1903.
A. T. TAYLOR.
COMBINED MUD GUARD AND LUGGAGE CARRIER.
APPLICATION FILED OCT. 27, 1902.
NO MODEL.
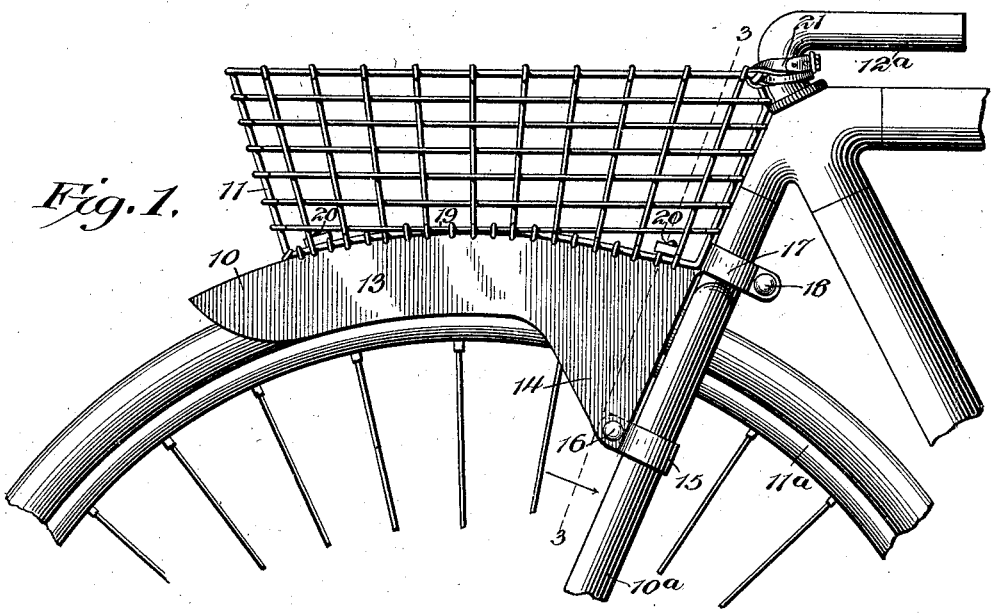
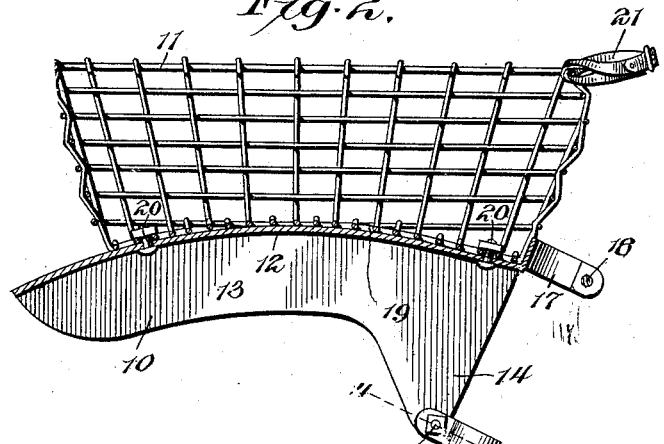
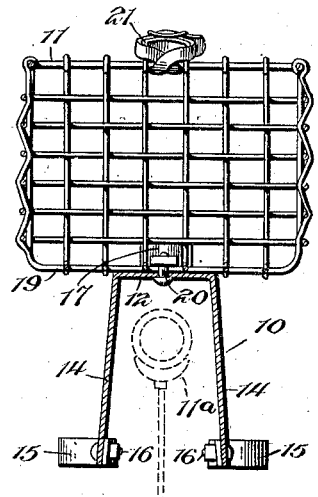
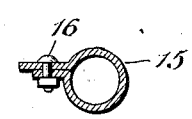
Alexander T. Taylor, Inventor
Witnesses
Howard W. Orr
B. J. Foster
By E. G. Siggers
Attorney No. 746,603. Patented December 8, 1903.

UNITED STATES PATENT OFFICE.

ALEXANDER THOMAS TAYLOR, OF SUTTON, WEST VIRGINIA.

COMBINED MUD-GUARD AND LUGGAGE-CARRIER.

SPECIFICATION forming part of Letters Patent No. 746,603, dated December 8, 1903.

Application filed October 27, 1902. Serial No. 129,022. (No model.)

*To all whom it may concern:*

Be it known that I, ALEXANDER THOMAS TAYLOR, a citizen of the United States, residing at Sutton, in the county of Braxton and State of West Virginia, have invented a new and useful Combined Mud-Guard and Luggage-Carrier, of which the following is a specification.

The present invention relates to a combined mud-guard and luggage-carrier; and the object is to provide a simple structure of this character wherein the two elements are so formed that the mud-guard constitutes a support for the receptacle or carrier, suitable means being employed whereby the whole can be securely and rigidly supported on a bicycle or other velocipede, so that said mud-guard will perform its usual functions and the structure cannot slip about or disagreeably rattle.

The preferred embodiment of the invention is fully illustrated in the accompanying drawings and is described in the following specification. It will, however, be apparent upon an inspection of the claims hereto appended that the construction herein set forth is open to various changes and modifications.

In the drawings, Figure 1 is a view in elevation of the rear portion of a bicycle, showing the mud-guard and luggage-carrier attached thereto. Fig. 2 is a longitudinal sectional view through the new structure. Fig. 3 is a transverse sectional view taken on the line 3 3 of Fig. 1. Fig. 4 is a detail sectional view taken on the line 4 4 of Fig. 2.

Similar reference-numerals indicate corresponding parts in all the figures of the drawings.

In order to show the application of the invention, the rear portion of a bicycle is illustrated in Fig. 1, the rear forks being designated by the reference-numeral $10^a$, the wheel by $11^a$, and the saddle-post by $12^a$. These may be of any desired or well-known construction.

The invention is made up of two elements—a mud-guard 10 and a receptacle 11. The mud-guard is in the form of a hood having a top 12, from the side edges of which depend spaced side walls 13, adapted to enclose the upper portion of the rear wheel 11 of a bicycle, said hood conforming, substantially, to the periphery of the wheel. The front ends of the side walls 13 are provided with depending bracing portions 14, to each of which is attached a frame-embracing clamp 15. As shown in Fig. 4, the clamps 15 are each made integral with the bracing portions and are in the form of looped metallic straps adapted to be bent around the fork-bars and secured by bolts, as 16. At the top of the front end of the hood is located another clamp 17, preferably cut from the same metal of which the hood is formed and bent upwardly in the manner clearly shown in Fig. 2. The arms of this clamp are arranged to embrace the rear fork just above the junction of the bars thereof, and their terminals are fastened together by a bolt, as 18.

The carrier 11 is shown in the form of a wire basket, but may be constructed of any material and in any form desired—as, for instance, a sheet-metal box. The bottom 19 of said basket conforms to the shape of the top of the hood upon which it rests, and in order that a secure support will be afforded the portion of said top upon which the basket rests is preferably made flat, as clearly shown in Fig. 3. The receptacle is fastened to the hood in any manner that may be efficient or desirable, though perhaps preferably by means of bolts 20, passing through the bottom 19 and top 12, so that the receptacle may be detached when desired and the mud-guard used by itself. It will be observed that the front ends of the hood and receptacle are alined, while the rear end of said hood projects beyond the rear end of the receptacle, and it will be understood that this projecting portion may be as long as necessary to prevent dirt thrown from the wheel striking either the back of the rider or articles placed in the receptacle. In order that the receptacle may be more rigidly held in place, a strap 21 or other suitable means is preferably employed to secure the upper end of the same to the saddle-post of the bicycle.

It will be evident that apparatus as thus constructed is very simple and at the same time strong and rigid. The mud-guard besides performing its usual functions constitutes a firm support for the carrier, being strengthened by the bracing portions 14, which are clamped to the rear forks, as above described. The arrangement of these clamps prevents the structure slipping about, and thus shifting the weight of articles carried in the receptacle from side to side. The receptacle is supported throughout its entire length, and articles of considerable weight may be placed therein, because the mud-guard on account of its shape constitutes a strong and rigid brace for the bottom of said receptacle.

It will of course be understood that the term "velocipede" as employed in the specification and claims refers to bicycles and all other vehicles of a similar nature.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In apparatus of the class described, the combination with a mud-guard hood, of means for securing the hood to a velocipede, a receptacle having a bottom arranged to rest upon the hood, means for securing the bottom of the receptacle to the top of the hood, and means for fastening the front end of the receptacle to the velocipede.

2. In apparatus of the class described, the combination with a mud-guard hood, of a receptacle mounted on the hood, said hood having one end projecting beyond one end of the receptacle, and means for separately securing the other end of the hood and the adjacent end of the receptacle to a velocipede.

3. In apparatus of the class described, the combination with a mud-guard hood complete in itself and having a substantially flat upper face, of a receptacle resting upon said face, the rear end of the hood projecting beyond the receptacle, the front end of the hood having depending bracing portions, and clamps secured to said front end for fastening the apparatus to a bicycle.

4. In apparatus of the class described, the combination with a mud-guard hood having a substantially flat upper face, of a receptacle resting upon said face, one end of the hood projecting beyond the receptacle, the opposite end of the hood having depending portions, a frame-engaging clamp secured to each of the depending portions, and another clamp attached to the top of the hood.

In testimony that I claim the foregoing as my own I have hereto affixed my signature in the presence of two witnesses.

ALEXANDER THOMAS TAYLOR.

Witnesses:
LOYD GAREE,
A. J. HYER.